United States Patent [19]

Dryden et al.

[11] Patent Number: 5,231,790
[45] Date of Patent: Aug. 3, 1993

[54] FLEA TRAP

[75] Inventors: Michael W. Dryden; Alberto B. Broce; Kent E. Hampton, all of Manhattan, Kans.

[73] Assignee: Kansas State University Research Foundation, Manhattan, Kans.

[21] Appl. No.: 899,629

[22] Filed: Jun. 16, 1992

[51] Int. Cl.⁵ .............................................. A01M 1/04
[52] U.S. Cl. ........................................ 43/113; 43/114
[58] Field of Search ................................... 43/113, 114

[56] References Cited

U.S. PATENT DOCUMENTS

| | | | |
|---|---|---|---|
| 1,819,551 | 8/1931 | Gourdon | 43/113 |
| 4,350,122 | 9/1982 | Shotwell . | |
| 4,485,583 | 12/1984 | Planty . | |
| 4,556,010 | 12/1985 | Persson | 43/113 |
| 4,566,220 | 1/1986 | Justice . | |
| 4,630,329 | 12/1986 | Shores . | |
| 4,649,861 | 3/1987 | Elkins et al. . | |
| 4,654,998 | 4/1987 | Clay . | |
| 4,686,789 | 8/1987 | Williams . | |
| 4,700,506 | 10/1987 | Williams . | |
| 4,815,232 | 3/1989 | Rawski . | |
| 4,852,517 | 8/1989 | Smith et al. . | |
| 4,918,856 | 4/1990 | Olive et al. . | |
| 4,979,329 | 12/1990 | Olive et al. . | |
| 5,029,411 | 7/1991 | Keenan . | |
| 5,044,112 | 9/1991 | Williams . | |
| 5,095,648 | 3/1992 | Keenan . | |

Primary Examiner—Kurt C. Rowan
Attorney, Agent, or Firm—Hovey, Williams, Timmons & Collins

[57] ABSTRACT

An improved flea trap (10) capable of arresting very high percentages of available fleas is provided which includes an illumination system (14) which is located in an elevated position and emits a preferred, relatively narrow-band visible spectrum; the source is operated to give an effective variable light intensity, such as by intermittent on-off operation thereof. Preferably, the trap (10) includes an upright frame assembly (12) supporting a central transparent tube (38). A low wattage incandescent light bulb (42) is positioned within tube (38) and serves, with a light filter sheet (54) applied to the interior of tube (38), to emit flea-attracting illumination presenting a spectrum having its maximum peak centered at a wavelength of from about 450-650 nm, and with a maximum peak half-height-width of from about 50-175 nm. On-off operation of bulb (42) is regulated by controller (46), in order to create alternating illumination-dark periods; each illumination period is advantageously from about 30 seconds-20 minutes, whereas each dark period is from about 1-60 seconds. An adhesive sheet (56) is applied to the outer surface of tube (38), and serves to capture and retain fleas attracted by illumination system (14) which impinge against the sheet (56).

22 Claims, 3 Drawing Sheets

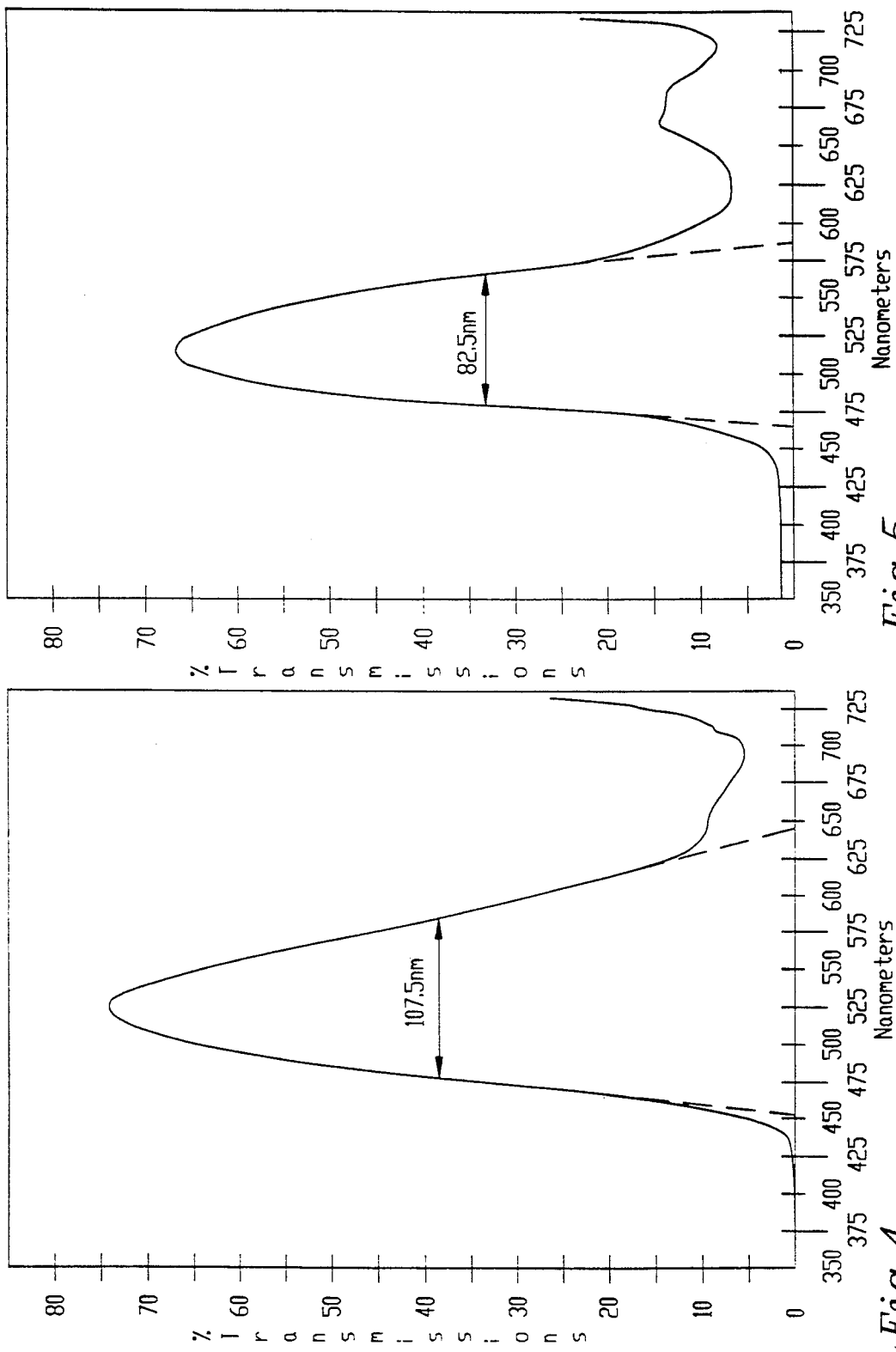

FLEA TRAP

BACKGROUND OF THE INVENTION

1. Field of the Invention

The present invention is broadly concerned with an improved flea trap designed for use in and around areas where flea infestation is a problem, such as homes, barns and livestock sheds. More particularly, it is concerned with such an improved flea trap, as well as a method of attracting fleas, which makes use of a light source operated to give effectively varying intensities over time and preferably presenting a relatively narrow visible light spectrum in order to greatly enhance the attraction and arrest (e.g., capture and/or destruction) of fleas.

2. Description of the Prior Art

A number of devices have been proposed in the past for the trapping of fleas. Such units may be used for the control or reduction of flea infestations in human or pet premises, and as a research tool for monitoring or surveying flea populations.

For example, U.S. Pat. No. 5,044,112 describes a flea trap including a visible light source adapted to be installed close to floor level and having a reflector above the light source to reflect light downwardly; a sticky capture surface is located below the light source in order to trap fleas attracted by the light source.

Despite the many attempts to provide truly useful flea traps, in general devices of this character have proven to be of limited effectiveness. Indeed, actual control testing of certain commercially available flea traps has demonstrated that they are capable of attracting and capturing only a small percentage of the available flea population.

SUMMARY OF THE INVENTION

The present invention overcomes the problems outlined above, and provides a greatly improved flea trap which has proven to be capable of attracting and arresting a very large percentage of available fleas in a confined area.

In one aspect of the invention, a flea trap is provided having a light source for attracting fleas, as well as operating means associated with the light source. The light source is advantageously operated to effectively vary the intensity of the light therefrom. For example, the source may be operated intermittently in an on-off manner to enhance its attractive power thereof. Alternately, means can be provided for passing an object in front of the light from time to time to create a shadow and thereby alter the effective intensity of the light source over time. In all cases, the effective intensity must sequentially drop from an elevated level to a low level, and then be raised to a level above the low level. This is in contrast to a gradually decaying light source, for example, which is not within the ambit of the invention. Generally speaking, the on-off duty of the light source should be such that it is operated for alternating on and off periods, with the on periods being greater than the alternating dark periods where the light source is not illuminated.

It has also been found that an improved flea trap can be provided wherein the light source presents a relatively narrow spectrum having its maximum peak centered at a wavelength of from about 450-650 nm, and with a maximum peak half-height-width of from about 50-175 nm. Such a narrow spectrum can be most easily obtained through use of a low power white light incandescent bulb in conjunction with an appropriate filter, so that the resultant emitted light is within the indicated limits. In preferred forms of the invention, the light source is positioned well above ground level, and specifically at a height of from about 6-18 inches above the ground.

Control testing of the preferred flea trap of the invention demonstrates that a large proportion, on the order of 70-98%, of available fleas can be attracted and arrested. This compares with present-day commercial flea traps which are capable of arresting only 2-21% of the available fleas.

BRIEF DESCRIPTION OF THE DRAWINGS

FIG. 4 is a visible light spectrum developed using the flea trap of the invention, and with a commercial (#878) filter applied to the interior surface of the upright transparent cylinder of the trap; and FIG. 5 is a visible light spectrum developed using the flea trap of the invention, with a combination of green and yellow translucent report cover materials being used as a single filter applied to the interior surface of the upright transparent cylinder of the trap.

DETAILED DESCRIPTION OF THE PREFERRED EMBODIMENTS

Figure 1:
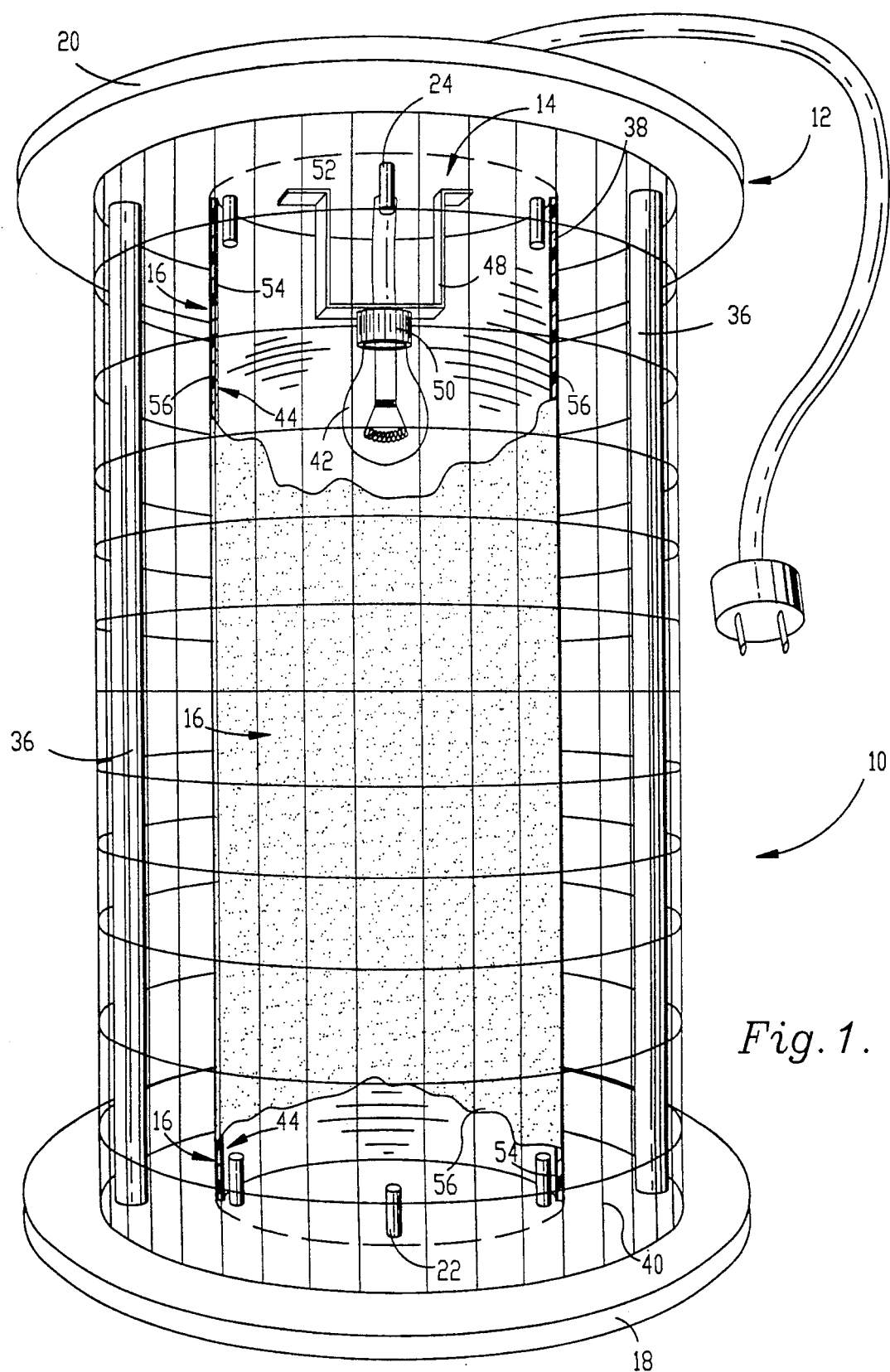
FIG. 1 is a front view of the preferred flea trap of the invention, with parts broken away to reveal the internal construction thereof.
Figure 2:
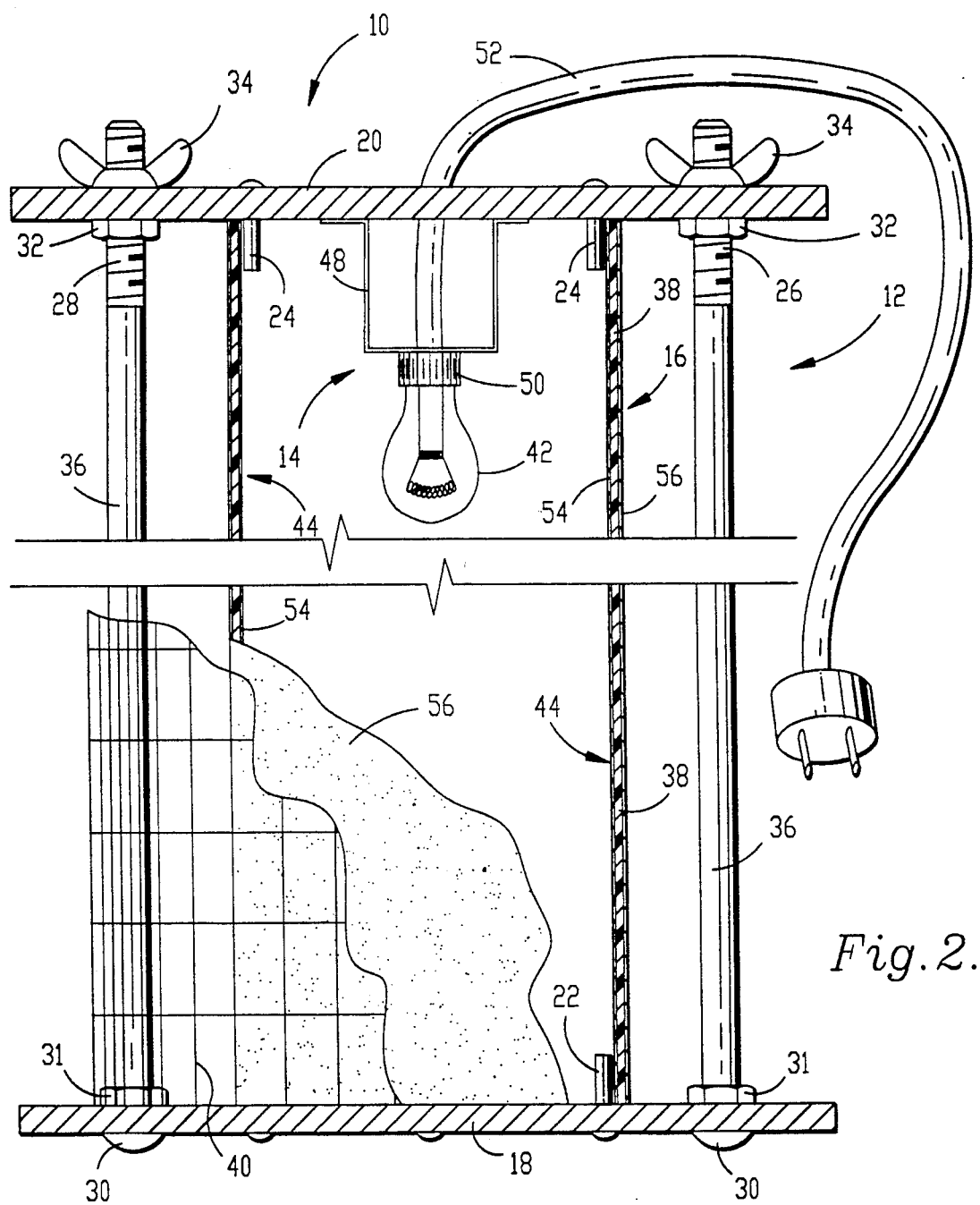
FIG. 2 is a fragmentary vertical sectional view with parts broken away of the preferred flea trap.
Figure 3:
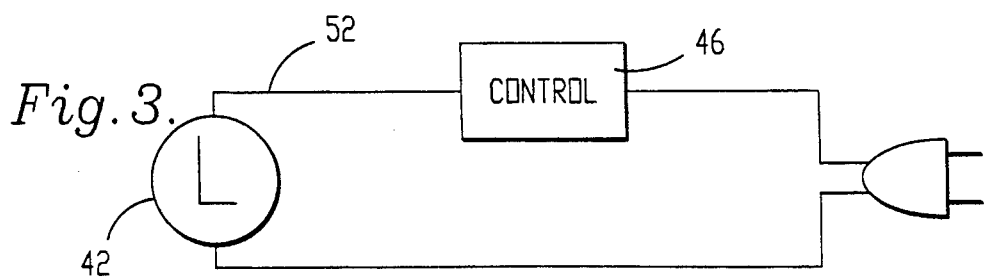
FIG. 3 is a schematic representation of the preferred electronic control for the flea trap light source.

Turning now to the drawings, and particularly FIGS. 1-3, a flea trap 10 in accordance with the invention is depicted. Broadly speaking, the trap 10 includes an upright frame assembly 12, illumination system 14, and flea-arresting means 16.

In more detail, the frame assembly 12 includes a lowermost circular apertured base 18, together with an uppermost apertured top plate 20. Both the base 18 and top plate 20 include a plurality of circularly arranged, projecting locating pins 22 (base 18) and 24 (top plate 20). The base 18 and top plate 20 are interconnected by means of a pair of threaded bolts 26, 28 passing through opposed apertures in the base and top plate. The heads 30 of the bolts 26, 28 project below base 18 as shown, and serve as feet. Alternately, these bolt heads could be recessed and would not protrude below the bottom surface of base 18, so as to give an operationally beneficial flush base configuration. A pair of lower support nuts 31 and upper support nuts 32 are respectively located on each bolt 26, 28 adjacent the lower and upper ends thereof. The base 18 is captively retained between bolt heads 30 and the nuts 31, whereas the top plate 30 rests upon the nuts 32. The interconnection of the base 18 and top plate 20 is completed by means of wing nuts 34 engaging the upper surface of top plate 20. The threading on bolts 26, 28 between the upper and lower support nuts 31, 32 is preferably covered by means of tubular members 36 as shown.

The overall frame assembly 12 further includes an upright, 6" diameter, transparent, light-transmitting synthetic resin tube 38 which is positioned between the base 18 and top plate 20 with the locating pins 22, 24 serving to maintain the tube 38 at the center of the trap 10. Finally, a circular section of large opening hardware cloth 40 is disposed about the central transparent tube 38 in order to prevent inadvertent contact with the interior of the trap 10.

The illumination system 14 in the embodiment shown is made up of three basic components, namely incandescent light bulb 42, light filter 44, and electronic controller 46. Referring to FIGS. 1 and 2, it will be observed that a U-shaped bracket 48 is affixed to the underside of top plate 20 and centrally within the confines of transparent tube 38. The bracket 48 supports a bulb socket 50, with electric power being supplied to the latter by means of conductor 52 extending through top plate 20. The light bulb 42 is preferably a standard 120 volt low wattage bulb, typically 12 watt.

Referring specifically to FIG. 3, it will be seen that electronic control 46 is operatively interposed within conductor 52. The purpose of controller 46 is to properly time the bulb 42 for on-off intermittent operation in the manner more fully described below. However, the controller itself is entirely conventional.

The filter 44 is advantageously in the form of a thin, translucent, synthetic resin sheet 54 applied to the inner surface of upright tube 38. Any convenient means such as glue or tape may be used to effect this application. The preferred filter is comprised of two commercially available report covers, one placed against the other. One of the covers is yellow and available from K. and M. Co. of Torrance, Calif.; the other being a green report cover available from C-Line Products Inc. of Park Ridge, Ill. An additional effective filter that is particularly useful is a 0.006" thick heat-resistant transparent filter sold by Edmund Scientific Co. of Barrington, N.J. as Filter #878.

The flea-arresting means 16 in the preferred embodiment comprises a sheet 56 bearing a sticky adhesive material capable of capturing and arresting fleas which impinge thereagainst. The sheet 56 is applied to the exterior surface of the tube 38, again by tape or any convenient means. The preferred sheet is a 0.010" thick ionomer plastic sold by Flex-O-Glass, Inc. of Chicago, Ill. as DuPont Surflex. The preferred adhesive material is a vinyl acetate copolymer sold by Olson Products, Inc. of Medina, Ohio under the designation "Sticky Stuff."

In the use of flea trap 10, it has been found that the arrest of fleas (as used herein "arrest" is intended to encompass all means of capture and/or destruction of fleas) is materially enhanced by operating light bulb 42 in an intermittent manner. An on-off duty cycle for the bulb 42 repeatedly stimulates fleas to orientate, move and jump towards the trap, as contrasted with light habituation and sedentary behavior exhibited by fleas in the presence of a continuous light source. Specifically, controller 46 is set to operate the light source for alternating illumination and dark periods, and particularly where the illumination periods are greater than the dark periods. Generally, each illumination period should be from about 30 seconds-20 minutes, while the dark periods are each from about 1-60 seconds; more preferably, the illumination periods should each be from about 2-15 minutes, while the dark periods are from about 2-20 seconds each.

In addition, it has been discovered that the illumination system 14 should be constructed and operated so as to present a visible light spectrum having a maximum peak centered at a wavelength of from about 450-650 nm, and with a maximum peak half-height-width of from about 50-175 nm; more preferred values are a maximum peak centered at a wavelength of from about 475-550 nm, and a maximum peak half-height-width of from about 70-150 nm. As indicated, the preferred embodiment makes use of a standard low wattage incandescent light bulb and an associated filter; those skilled in the art will appreciate that if desired, a light source could be used which would directly emit the proper spectrum for flea attraction.

The light source of the invention is also preferably located in an elevated position above ground level. This has been found to enhance the attractiveness and effective range of the flea trap. Broadly, the light source should be located at a height of from about 6-18 inches above ground level, and more preferably from about 8-12 inches above ground level.

FIGS. 4 and 5 are respectively the visible light spectra generated using two preferred light filter sheets 54 in the trap of the invention. FIG. 4 depicts the spectrum using the commercial #878 filter, which gives a peak at 525 nm and 73.4% transmission. The half-height-width of this maximum peak is shown as being 107.5 nm, whereas the peak base width between the dotted line projections is 192.5 nm. The most preferred filter is fabricated from green and yellow report covers, and the spectrum developed using this material is shown in FIG. 5. In this case, the peak is located at 515 nm at 67.0% transmission, with a half-height-width of 82.5 nm and a peak base width between the dotted line projections of 127.5 nm.

The following examples describe a series of comparative tests confirming the excellent results achieved using the preferred flea trap of the invention. It should be understood that the examples are presented by way of illustration only, and nothing therein should be taken as a limitation upon the overall scope of the invention.

EXAMPLE 1

A test was conducted to determine the most attractive visible spectrum for the attraction of adult fleas. A 0.9 m diameter arena was constructed with a plywood floor and an annular, upright, 0.48 m high wall of sheet metal extending above the plywood floor. The arena was built on an oversized turntable to allow rotation of the arena as required. The arena was fitted with a wooden lid painted black on its inner surface; a 2.5 cm hole was provided in the center of this lid for introducing fleas at the start of the experiments. Four 8.5 cm diameter ports were placed in equidistance relationship to each other around the base of the upright wall. A pane of non-glare glass was placed in covering relationship to each of these ports. A filter holder was placed adjacent the outside of each port, and a PVC pipe (8.5 cm diameter) was attached to each of the filter holders. A 20 watt, 12 volt incandescent lamp (tungsten halogen) was placed at the end of each PVC pipe on a housing allowing the lamps to be slid within the pipes for adjustment of the light intensity passing through each filter.

A series of plastic narrow-band pass filters (Edmond Scientific Co.) to cover the entire visible spectrum were obtained for testing. In all tests, the white light from the bulbs was used as a standard, which was emitted from a pair of opposite ports. The filter to be evaluated was used in the remaining two opposing ports.

Before each test was initiated, the intensity of the lights entering the arena from the four ports was measured. By using neutral density filters and moving the respective light assemblies along the length of the PVC pipes, all lights entering the arena were set at 300 mW/cm$^2$. White index cards (7.5 × 13 cm) were coated with adhesive (Sticky Stuff, Olson Products, Medina, Ohio) and placed on the arena floor in front of each port. Each card had a long black sewing thread running over the arena wall and to the outside.

One hundred 1-2 day-old adult fleas were introduced into the arena for each test, through a 2.5 cm glass tube inserted through the center of the lid. After 10 minutes, the lights were turned on and a test period of several hours was initiated. At the end of the test period, the adhesive-coated cards were pulled using the threads and the fleas captured on each card recorded.

The results for each test were analyzed by analysis of variance at the P=0.05 level. These results indicated that a light-green filter (#871) had an equal attractancy for fleas as the white (standard) light. A yellow-green (#878) filter attracted significantly more fleas (1.64×) than the standard. This commercial filter exhibited a spectrum having a maximum peak centered at 525 nm, a 107.5 nm half-height-width, and a peak base width of 192.5 nm. However, a green-yellow filter made of translucent "report covers" attracted more fleas than the standard (2.14 ×) and yellow-green filters. The spectrum of this yellow and green report cover filter had a maximum peak centered at 515 nm, an 82.5 nm half-height-width, and a peak base width of 127.5 nm.

The light spectra for the #878 commercial filter and the green-yellow report cover filter are respectively set forth in FIGS. 4 and 5.

EXAMPLE 2

In this test, the utility of an intermittent on-off duty cycle for the light source was tested. In an initial experiment, the preferred trap design described previously was used wherein the light was illuminated continuously. This setup was tested against a commercially available (Happy Jack) flea trap. The traps were respectively placed in the center of an 11 × 12 foot carpeted arena and 25 1-3 day-old fleas were placed at each of the four corners of the arena. The arena was sealed to eliminate all extraneous light. In each case, the comparative traps were left on for approximately 20 continuous hours. After four replicate experiments, the commercial Happy Jack unit collected an average of 20.6% of the fleas released, while the trap design hereof operated continuously collected 28.5% of the fleas released.

Fleas when searching for a host are attracted by light. Fleas are stimulated to jump toward their hosts by changes in light intensity (e.g., light to dark, or dark to light) which represent shadows created by their host. It was observed that a high percentage of the fleas used during testing traps with a continuous light source remained at the release point even after 20 hours. In addition, with a continuous light, of those fleas that moved from the release point toward the trap, many settled or became motionless in the vicinity of the trap. In the improved trap the use of an intermittent light source increased the number of fleas that moved from the release point. In addition, this mechanism stimulated those fleas that had settled in the vicinity of the trap to reinitiate movement toward the trap.

In a second test, the preferred flea trap of the present invention was again placed in the center of the large arena and 25 fleas were placed at each of the four corners. Again, the arena was sealed to eliminate extraneous light, and the on-off duty cycle of the trap was set at 10 minutes on and 5 seconds off, this being regulated by an electronic timer. The duration of each trapping test period was 20 hours. After each replication, the trap was removed and the arena was vacuumed to recover all fleas remaining. After four replicate trapping periods, the intermittently operated trap of the invention collected an average of 79.7% of the fleas released. Taking into account an average 18.3% flea death loss in the arena during the 20 hours period, only 2% of the fleas recovered in the arena were alive. Thus, the intermittently operated trap of the invention in effect collected 98% of available live fleas.

EXAMPLE 3

Another series of tests were conducted to ascertain the effect of the higher placement of the light source in this improved trap may have on the attraction of fleas from a greater distance. Distance trials were conducted by releasing approximately 100 fleas 411 cm (13.5 feet) diagonally across a carpeted arena from test flea traps. In four replicate trials the preferred flea trap design described above collected an average of 69% of the fleas released 13.5 feet from the trap. After vacuum-ing, it was determined that an average of 10.75% of the fleas recovered in the arena were dead, and 19% were still alive and uncaught, resulting in a 77.9% trapping of available fleas. When the commercial Happy Jack unit was tested under identical conditions, it trapped only an average of 3.8% of the fleas released 13.5 feet from the trap, with an average of 78.5% of the fleas still alive in the arena after the trapping period. Accordingly, the Happy Jack unit trapped only about 4.5% of the available fleas.

In a related test, the arena was reconstructed so that a second identical area could be built in the same room, with arenas separated by a large sheet of black plastic. The new arena dimensions were 325 cm × 307 cm (10'8" × 10'1"). Initial tests in the new arenas compared the trap of the present invention versus another commercial trap, the "NUPO Ultimate Flea Trap." Three replicate 20 hour trapping periods for each device were conducted by releasing 25 fleas at each of the four corners of the arena and placing the test trap in the center of the arena. The commercial NUPO trap caught an average of 2.7% of the fleas released, whereas the trap of the present invention captured an average of 88% of the fleas.

We claim:

1. In a flea trap adapted to rest upon a surface and having a light source for attracting fleas, and means proximal to said light source for arresting attracted fleas, the improvement which comprises means mounting said light source close to said surface, and means operably associated with said light source for intermittently changing the effective intensity of the light from said light source in a manner to enhance the attracting power of the light source, by sequentially lowering the light intensity from an elevated level to a low level, and then raising the intensity back to a level higher than said low level, said light source operating at said higher intensity for periods of at least about 30 seconds and at said lower intensity for periods less than said higher intensity periods, the sequential higher intensity-lower intensity operation of said light source serving to attract fleas and stimulate movement thereof towards said light source and the proximal flea-arresting means.

2. The flea trap of claim 1, including means coupled with said light source for intermittent on-off operation of the light source.

3. The flea trap of claim 2, said light source operating means serving to operate said light source for illumination periods of time greater than intermittent dark periods of time where the light source is not illuminated.

4. The flea trap of claim 3, said illumination periods each being from about 30 seconds-20 minutes, and said dark periods each being from about 1-60 seconds.

5. The flea trap of claim 4, said illumination periods being from about 2-15 minutes, and said dark periods being from about 2-20 seconds.

6. The flea trap of claim 1, said flea-arresting means comprising adhesive means adjacent said light source for arresting fleas impinging against the adhesive means.

7. The flea trap of claim 6, said flea-arresting means having an upright light-conveying wall with said adhesive means applied to one surface of said wall, said light source being located adjacent the opposed surface of said wall.

8. The flea trap of claim 7, said wall being annular in cross-section, said light source being disposed within said annular wall, said adhesive means being applied to the exterior surface of said annular wall.

9. The flea trap of claim 1, said light source presenting a spectrum having its maximum peak centered at a wavelength of from about 450-650 nm, and with a maximum peak half-height-width of from about 50-175 nm.

10. The flea trap of claim 9, said maximum peak being centered at a wavelength of about 475-550 nm, and said maximum peak half-height-width being from about 70-150 nm.

11. The flea trap of claim 1, said light source comprising in combination a white light source and means for filtering the white light emitted from said source for emitting a light spectrum for attracting fleas.

12. The flea trap of claim 1, including means supporting said light source at an elevated position above the ground, said flea-arresting means including an upright wall supporting a flea-arresting adhesive.

13. The flea trap of claim 12, said light source supporting means including structure for supporting the light source at a height of from about 6-18 inches above the ground.

14. The flea trap of claim 13, said light source being supported at a height of from about 8-12 inches above the ground.

15. A method of attracting fleas comprising the steps of positioning a light source in the vicinity of fleas to be attracted and closely adjacent the ground, and intermittently altering the effective intensity of the light source in a manner to attract said fleas, said intensity altering step comprising the steps of sequentially lowering said intensity from an elevated level to a lower level, and then raising the intensity level above said low level, said light source operating at said higher intensity for periods of at least about 30 seconds and at said lower intensity for periods less than said higher intensity periods, the sequential higher intensity-lower intensity operation of said light source serving to attract fleas and stimulate movement thereof towards said light source.

16. The method of claim 15, including the step of intermittently operating said light source.

17. The method of claim 15, including the step of operating said light source for illumination periods of time greater than intermittent dark periods of time when the light source is not illuminated.

18. The method of claim 17, said illumination periods each being from about 30 seconds14 20 minutes, and second dark periods each being from about 1-60 seconds.

19. The method of claim 18, said illumination periods being from 2-15 minutes and said dark periods being from about 2-20 seconds.

20. The method of claim 15, including the step of arresting fleas attracted towards said light source.

21. The method of claim 15, said light source presenting a spectrum having its maximum peak centered at a wavelength of from about 450-650 nm, and with a maximum peak half-height-width of from about 50-175 nm.

22. The method of claim 21, said maximum peak being centered at a wavelength of from about 475-550 nm, and said maximum peak half-height-width being from about 70-150 nm.

* * * * *